United States Patent [19]

Patterson et al.

[11] 4,176,096

[45] Nov. 27, 1979

[54] PREDISPERSED COMPOSITION FOR USE IN THERMOSETTING ACRYLIC AUTOMOTIVE FINISHES

[75] Inventors: George Patterson, Philadelphia; Edgar N. Putman, New Hope; John B. McCool, III, Ottsville, all of Pa.

[73] Assignee: PFD/Penn Color, Inc., Doylestown, Pa.

[21] Appl. No.: 885,529

[22] Filed: Mar. 13, 1978

Related U.S. Application Data

[63] Continuation of Ser. No. 707,489, Jul. 22, 1976, abandoned.

[51] Int. Cl.² .................................................. C08L 1/14
[52] U.S. Cl. ..................................... 260/15; 260/17 R; 260/42.52; 260/42.54; 260/42.56; 260/42.57
[58] Field of Search ................... 260/15, 42.54, 42.56, 260/42.57, 42.52, 17 R

[56] References Cited

U.S. PATENT DOCUMENTS

| | | | |
|---|---|---|---|
| 2,545,174 | 3/1951 | Sido | 260/556 |
| 2,649,382 | 8/1953 | Vesce | 106/193 |
| 3,088,837 | 5/1963 | Prescott et al. | 106/309 |
| 3,215,663 | 11/1965 | Weisberg | 260/42.57 |
| 3,676,377 | 7/1972 | Anderson et al. | 260/15 |
| 3,706,708 | 12/1972 | Kearnan | 260/79.5 |
| 3,712,824 | 1/1973 | Kiyokawa et al. | 106/308 M |
| 3,830,765 | 8/1974 | Fejer | 260/27 R |
| 3,959,193 | 5/1976 | Putman et al. | 260/15 |
| 4,113,650 | 9/1978 | Putman et al. | 252/363.5 |

Primary Examiner—Edward M. Woodberry
Attorney, Agent, or Firm—Benasutti Associates, Ltd.

[57] ABSTRACT

A novel, durable thermosetting acrylic automotive finish and method for manufacturing same is described which is manufactured from a predispersed, substantially dry composition. The resultant thermosetting acrylic finish has a higher pigment loading at a sprayable viscosity, thereby reducing the number of applications necessary to produce an acceptable automotive finish. In tests conducted by applicants, the described thermosetting acrylic automotive finish exhibits acceptable durability when exposed to solar radiation for extended periods of time.

16 Claims, No Drawings

PREDISPERSED COMPOSITION FOR USE IN THERMOSETTING ACRYLIC AUTOMOTIVE FINISHES

CROSS-REFERENCE TO RELATED APPLICATIONS

This is a continuation of application Ser. No. 707,489, filed July 22, 1976 and now abandoned.

This application is related to our prior application Ser. No. 340,453, filed Mar. 12, 1973, now U.S. Pat. No. 3,959,193, granted on May 25, 1976 entitled "Utilization of Cellulose Acetate Butyrate and Aryl Sulfonamide Formaldehyde Resin Containing Dispersant" and assigned to the assignee of the present application, which patent is specifically incorporated as if fully set forth herein.

This application is also related to U.S. patent application Ser. No. 601,628, filed Aug. 4, 1975 now U.S. Pat. No. 4,113,650, dated Sept. 12, 1978, and entitled "Universal Additive Dispersant".

BACKGROUND OF THE INVENTION

The present invention relates generally to automotive finishes, and more particularly, to methods of manufacturing automotive finishes of the thermosetting type.

Presently, at least one major automobile manufacturer in this country is using a thermosetting arcylic resin solution to paint its cars. This thermosetting acrylic solution is known to the art as "NAD Type II". Although this NAD Type II thermosetting acrylic resin is compatible with many other standard dispersant resins, upon extended exposure tests, where the resultant auto finishes are exposed to the sun over a period of approximately two years, the resultant auto finish lacks durability and may exhibit either a dullness or a slight separation of pigment and resin, i.e. a loss of finish uniformity which is considered to be unacceptable in most auto finishes. Accordingly, it is common practice to avoid any dispersion of pigments in any other resin other than NAD Type II. Therefore, according to the present techniques, NAD Type II is dispersed at an automotive plant in a ball mill with the desired pigment in order to produce a sprayable resin composition having approximately ten percent (10%) pigment loading. In this ball mill operation, the ball mill itself is utilized to grind the pigment and to disperse the pigment in the final NAD Type II thermosetting acrylic resin solution. Attempts at predispersing pigments in NAD Type II resins have not been economically practical since NAD Type II may be loaded with pigment only to approximately twenty weight percent, at which percentage a sprayable viscosity is not present. NAD Type II resin is a liquid in its natural state and is therefore difficult to handle, minimizing the practicality of predispersing pigment (or other resin additives) therein prior to use. Half as much predispersed resin additive must be prepared and shipped by the dispersion house as is required for the final end use, thereby giving rise to the present practice of initially preparing final dispersions as paint is required.

In addition to the above problems, any predispersed resin additive must be suitable for use with the various ketone and aromatic solvents which are commonly added to NAD Type II resin systems for the purpose of controlling the viscosity and drying time. An otherwise suitable predispersed composition will not be acceptable to the industry if such a ketone-aromatic solvent compatability is not evidenced.

Although NAD Type II thermosetting acrylic automotive finishes have met with some success, it is nonetheless necessary for the particular automotive manufacturers to make substantial investments in ball mills installed at or near the paint site which must run for between 24 and 72 hours, during which time the pigment is ground and dispersed into the NAD Type II-type acrylic resin solution.

SUMMARY OF THE INVENTION

The present invention provides a novel method of predispersing pigments to form a dry, pigment-containing dispersant composition, which composition may contain as high as 80–85% pigment and only as little as 15–20% dispersant composition. This high pigment loading and the dry nature of the dispersant composition makes it economical for dispersion houses to predisperse pigments which heretofore were first dispersed at the paint site. The cost of the predispersed composition is minimized since very little resin must be added to the pigment during predispersion. Additionally, since this predispersed composition is particularly suitable for use with the ketone and aromatic solvent solutions already used to modify the viscosity, etc. of NAD Type II paints, a novel method is provided wherein the dry, predispersed pigment-containing composition may readily be predissolved in that ketone-aromatic solution prior to its introduction in a liquid state into the thermosetting acrylic resin material. Finally, due to the superior characteristics exhibited by the predispersed pigment-containing composition, it is possible to attain a sprayable viscosity when the final paint composition incorporates only 10 to 30 weight percent and preferably twenty percent (20%) solvents, instead of the approximately forth percent (40%) solvent-containing percentage heretofore required by the above described prior art technique. Using the above described method, it is anticipated that by dissolving the predispersed composition in the ketone and aromatic solution, it is possible to arrive at a suitable paint solution in one to two hours of ball mill time, instead of the 24 to 72 hours heretofore required.

An alternate method contemplated by the present invention is the dispersion of the dry predispersed composition directly into the NAD Type II without the initial addition of ketone and aromatic solution, in which case, it is expected that the ball mill time would be reduced from 24 to 72 hours to approximately 6 to 12 hours.

Accordingly, the primary object of the present invention is to provide a dry, predispersed pigment-containing composition which, when combined in a conventional NAD Type II thermosetting acrylic resin solution, produces a durable automotive finish. Another object of the present invention is the provision of a predispersed pigment-containing material which may be quickly dissolved in conventional ketone-aromatic solvents for subsequent rapid dispersion in NAD Type II thermosetting acrylic resins. A further object of the present invention is the provision of a predispersed resin additive composition containing an excess of sixty percent (60%) and as high as eight-five percent (85%) resin additive (pigment), while retaining suitable end-product characteristics. Another object of the present invention is the provision of a predispersed pigment-containing material for addition to thermosetting acrylic resin systems which requires substantially less ball mill time than that required for dispersion of pigments directly into thermosetting acrylic resin systems. A further object of the present invention is the provision of an automotive thermosetting acrylic paint solution having a sprayable viscosity at a level of between 15 and 20 weight percent and preferably twenty weight percent pigment and an according increase in the per coat deposition of pigment. These and other objects of the present invention will become apparent from the following, more detailed description.

DESCRIPTION OF THE PREFERRED EMBODIMENT

The present invention pertains to a novel method and composition obtained from using a particular predispersed composition containing a particularly high pigment loading. As used herein, the term "resin additive" refers to a finely divided particulate material which is generally insolvent in most solvent systems and which is used to impart color (in the case of pigments), fire resistance (antimony oxide), lubricity (talc), and other similar properties to resinous materials which are thereafter formed into a final product such as a molding, a film, etc. In particular, a pigment-containing predispersed composition consisting essentially of 60% to 80-85% pigment is prepared with the remainder consisting of 40-70 weight percent aryl sulfonamide formaldehyde resin and 30-70 weight percent cellulose acetate butyrate. With the exception that the pigment loading is preferably higher in the present composition, this composition is similar to that disclosed in the above mentioned prior related patent, U.S. Pat. No. 3,959,193, granted on May 25, 1976, which patent disclosure is incorporated by reference as if fully set forth herein. Following the preparation of the predispersed resin-additive containing composition, this composition is added to an appropriate ketone and aromatic-containing solution, which in turn in added to obtain the desired pigment loading sprayable viscosity and drying characteristics of the final thermosetting acrylic resin paint.

EXAMPLES

In order to determine the durability of the resulting composition (paint), the following experiments were conducted to determine the durability of the finish after application to conventional test panels:

A dispersion blending base was prepared as follows: A one-half pint can was charged with 36 grams of NAD solvent blend (i.e. ketone and aromatic solvents) and 9.0 grams of acetone. To this charge, 15.0 grams of predispersed pigment containing composition, as described above, was added, having a 65% pigment loading. To the resulting solution, 40.0 grams of ⅛ inch buckshot was added and it was shaken on a RED DEVIL® shaker for 45 minutes. The solution was checked for clarity before adding 37.0 grams of thermosetting acrylic resin solution (51% N.V.) after which the can was returned to the shaker for an additional 20 minutes. The final paint composition was 10% pigment, 5.38% aryl sulfonamide formaldehyde-cellulose acetate butyrate binder, 19.12% acrylic resin solids, and 65.49% volatiles (since NAD Type II is liquid in its natural state, it naturally contains a relatively high volatiles and relatively low solids content). This dispersion base was prepared as described above, using each of three different pigments, namely monastral blue BT-284D, phthalo blue B-4804, and Perrindo red R-6418. The R-6418 dispersion, RD-5531, did not cut in with the 9.0 grams of acetone, which amount was increased by 52% to 13.5 grams. Each of the dispersion bases for the various pigments were then incorporated into complete enamels containing pigment in the proportions of 90% color and 10% Silberlines (3141AR), aluminum and sufficient binder solids for proper hiding at a dry film thickness of 1.5 mls. Sample plates of these bases were then compared with conventional ball mill NAD Type II finishes as follows: The above described dispersion base incorporating 65% of monastral blue (BT-284D) was labeled panel EM-2057 #5, at a pigment to binder ratio of 1:11. This was compared to a Harmon Lab steel ball mill grind of BT-284D which was labeled panel EM-2057 #4, at a pigment to binder ratio of 1:11.

The phthalo blue dispersion base was similarly compared to a Harmon Lab steel ball mill grind. The embodiment in accordance with the present invention was labeled EM-2059 #7, at a pigment to binder ratio of 1:11, whereas the Harmon Lab steel ball mill grind of B-4804 (phthalo blue) was labeled panel EM-2059 #3, also at a pigment to binder ratio of 1:11. Finally, the Perrindo red (R-6418) was prepared and labeled EM-2059 #12, while the corresponding ball mill grind was labeled EM-2059 #11. Each of these were prepared at pigment to binder ratios of 1:9.15, however, the dispersion base panel EM-2059 did not exhibit appropriate gloss and therefore, no additional testing was conducted.

The monastral blue and phthalo blue panels, both considered extremely difficult colors to produce with suitable durability, were then exposed for extended lengths of time in the Florida sun to determine the durability of the finishes. At the conclusion of the tests, these finishes were evaluated and considered to be at least of equal quality as the corresponding NAD Type II ball mill grinds.

It will be understood that various changes in the details, materials and arrangement of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a non-legal, technical statement of the contents of the disclosure in compliance with the Rules of Practice of the United States Patent and Trademark Office, and is not intended to limit the scope of the invention described and claimed herein.

What is claimed is:

1. A method of making a durable automotive spray-paint, comprising the steps of:
   (a) predispersing a pigment into a dispersant composition consisting essentially of 30-70 weight percent aryl sulfonamide formaldehyde resin and 30-70 weight percent cellulose acetate butyrate to produce a dry, predispersed composition containing 60-85 weight percent of said pigment;
   (b) dissolving said predispersed composition in a preselected amount of solvent solution to produce a liquid predispersed composition; and
   (c) mixing said liquid predispersed composition with a preselected amount of thermosetting acrylic resin to produce an automotive paint containing between 15 and 22 weight percent of said pigment, said preselected amount of solvent solution being selected to produce a paint of a sprayable viscosity.

2. The method of claim 1 wherein said solvent solution comprises aromatic solvents.

3. The invention of claim 1 wherein said solvent solution comprises ketone solvents.

4. The invention of claim 1 wherein said solvent solution consists essentially of a mixture of ketone and aromatic solvents.

5. The invention of claim 1 wherein said preselected amount of solvent solution comprises less than 30% by weight of said automotive paint.

6. The invention of claim 1 wherein said liquid predispersed composition is produced by mixing in a ball mill for at least one hour.

7. The invention of claim 1 wherein said dry predispersed composition is prepared in advance and stored until needed for use.

8. A method of making a durable, automotive spray-paint comprising the steps of:
   (a) predispersing a pigment into a dispersant composition consisting essentially of 30–70 weight percent aryl sulfonamide formaldehyde resin and 30–70 weight percent cellulose acetate butyrate to produce a dry, predispersed composition containing 60–85 weight percent of said pigment;
   (b) dispersing said dry predispersed composition in a preselected amount of thermosetting acrylic resin to produce a viscous, automotive paint precursor; and
   (c) diluting said viscous, automotive paint precursor with a preselected amount of solvent solution to produce an automotive paint containing between 15 and 22 weight percent of said pigment and having a sprayable viscosity, whereby the automotive finish produced thereby exhibits durability to exposure to solar radiation over a period of years.

9. The invention of claim 8 wherein said preselected amount of solvent solution comprises between 10 and 30% of the weight of said automotive paint.

10. The invention of claim 8 wherein said dispersion step comprises the step of dispersing said dry, predispersed composition in a preselected amount of thermosetting acrylic resin in a ball mill for approximately 6 to 12 hours.

11. The invention of claim 8 wherein said solvent solution comprises aromatic solvents.

12. The invention of claim 8 wherein the solvent solution comprises ketone solvents.

13. The invention of claim 8 wherein the solvent solution consists essentially of a mixture of ketone and aromatic solvents.

14. The invention of claim 8 wherein said dry, predispersed composition is prepared in advance and stored until needed for use.

15. A durable, automotive spray paint consisting essentially of 15 to 22 percent pigment, 10 to 30 percent solvent, 3.3 to 6 percent pigment dispersant composition and 42 to 71.7 percent thermosetting acrylic resin, said pigment dispersant composition consisting essentially of 30–70 weight percent aryl sulfonamide formaldehyde resin and 30–70 weight percent cellulose acetate butyrate.

16. A method of dispersing, diluting and applying to a surface to be painted a uniform thermosetting automotive finish capable of prolonged exposure to solar radiation while maintaining its finish uniformity comprising the steps of:
   (a) first preparing a dry, cake-like predispersed composition by predispersing a pigment into a premixed, dispersant composition consisting essentially of 30–70 weight percent aryl sulfonamide formaldehyde resin and 30–70 weight percent cellulose acetate butyrate to produce said dry, predispersed composition said composition containing 60–85 weight percent of said pigment;
   (b) storing said dry, predispersed composition until needed for use;
   (c) dissolving said predispersed composition in a preselected amount of solvent solution to produce a liquid predispersed composition;
   (d) mixing said liquid predispersed composition with a preselected amount of thermosetting acrylic resin in a ball mill for between about one to two hours to produce an automotive paint containing between 15 and 22 weight percent of said pigment, said preselected amount of solvent solution consisting essentially of a mixture of ketone and aromatic solvents, said mixture comprising between 10 and 30% by weight of said automotive paint and being sufficient to produce a paint of a sprayable viscosity; and
   (e) applying said paint by spraying said surface, whereupon said paint is allowed to dry and cure to a durable, uniform thermoset automotive finish.

* * * * *